US008657892B2

United States Patent
Patil et al.

(10) Patent No.: US 8,657,892 B2
(45) Date of Patent: Feb. 25, 2014

(54) DOWNDRAFT GASIFIER WITH INTERNAL CYCLONIC COMBUSTION CHAMBER

(75) Inventors: Krushna N. Patil, Stillwater, OK (US); Raymond L. Huhnke, Stillwater, OK (US); Danielle D. Bellmer, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 897 days.

(21) Appl. No.: 12/493,988

(22) Filed: Jun. 29, 2009

(65) Prior Publication Data

US 2010/0037519 A1 Feb. 18, 2010

Related U.S. Application Data

(63) Continuation-in-part of application No. 11/773,617, filed on Jul. 5, 2007.

(60) Provisional application No. 61/076,180, filed on Jun. 27, 2008.

(51) Int. Cl.
*C10J 3/08* (2006.01)

(52) U.S. Cl.
USPC .......................................................... 48/62 R

(58) Field of Classification Search
USPC .................................................. 48/61–118.5
See application file for complete search history.

(56) References Cited

U.S. PATENT DOCUMENTS

| | | | | |
|---|---|---|---|---|
| 1,913,646 A | * | 6/1933 | Terzian | 48/71 |
| 4,071,329 A | * | 1/1978 | Eales | 48/62 R |
| 4,183,208 A | * | 1/1980 | Horgan et al. | 60/39.12 |
| 4,459,136 A | * | 7/1984 | Linneborn et al. | 48/111 |
| 4,583,992 A | * | 4/1986 | Rogers | 48/76 |
| 7,569,204 B2 | | 8/2009 | Leveson | |
| 2005/0155288 A1 | * | 7/2005 | Rogers | 48/197 FM |
| 2006/0265954 A1 | * | 11/2006 | Dogru et al. | 48/197 R |

FOREIGN PATENT DOCUMENTS

WO WO2009009693 1/2009

OTHER PUBLICATIONS

Gabra, et al., "Evaluation of cyclone gasifier performance for gasification of sugar cane residue—Part 1: gasification of bagasse", "Biomass & Bioenergy", Jun. 26, 2001, pp. 351-369, vol. 21, Publisher: Elsevier Science Ltd., Published in: US.

Gabra, et al., "Development of a Sugar Cane Residue Feeding System for a Cyclone Gasifier", "Biomass & Bioenergy", 1998, pp. 143-153, vol. 15, No. 2, Publisher: Elsevier Science Ltd., Published in: US.

Gabra, et al., "Alkali retention/separation during bagasse gasification: a comparison between a fluidised bed and a cyclone gasifier", "Biomass & Bioenergy", Jun. 26, 2001, pp. 461-476, vol. 21, Publisher: Elsevier Science Ltd., Published in: US.

(Continued)

*Primary Examiner* — Imran Akram
(74) *Attorney, Agent, or Firm* — Fellers, Snider, Blankenship, Bailey & Tippens, P.C.; Terry L. Watt

(57) ABSTRACT

A downdraft gasifier is disclosed. The gasifier includes a biomass section that accepts and stirs raw biomass materials, a pyrolysis and tar cracking section having an inner cylinder for receiving biomass and an outer surrounding cylinder for gases from the biomass, and a char gasification section for receiving biomass and gases from the pyrolysis and tar cracking section. The char gasification section provides a grating and scraper for passing gases and ash and retaining biomass for char gasification on the grate.

10 Claims, 8 Drawing Sheets

(56) References Cited

OTHER PUBLICATIONS

Pathak, et al., "Performance evaluation of an agricultural residue-based modular throat-type down-draft gasifier for thermal application", "Biomass and Bioenergy", Aug. 15, 2007, pp. 72-77, vol. 32, Publisher: Elsevier Ltd., Published in: US.

Ratnadhariya, et al., "Experimental studies on molar distribution of CO/CO2 and CO/H2 along the length of downdraft wood gasifier", "Energy Conversion and Management", 2001, pp. 452-458, vol. 51, Publisher: Elsevier Ltd., Published in: US.

Avdhesh KR. Sharma, "Experimental study on 75 kWth downdraft (biomass) gasifier system", "Renewable Energy", 2009, pp. 1726-1733, vol. 34, Publisher: Elsevier Ltd., Published in: US.

Sheth, et al., "Experimental studies on producer gas generation from wood waste in a downdraft biomass gasifier", "Bioresource Technology", Feb. 23, 2009, pp. 3127-3133, vol. 100, Publisher: Elsevier Ltd., Published in: US.

Patil et al., "Gasification of Switchgrass Using a Unique Downdraft Reactor", Paper No. 084415 ASABE Meeting Presentation, Jul. 9, 2006, Publisher: ASABE.

Patil et al., "Gasification of Switchgrass Using a Unique Downdraft Reactor" (poster), Jul. 17, 2005, Publisher: ASAE Annual International Meeting.

\* cited by examiner

DOWNDRAFT GASIFIER WITH INTERNAL CYCLONIC COMBUSTION CHAMBER

CROSS-REFERENCE TO RELATED APPLICATIONS

This application is a continuation-in-part of U.S. patent application Ser. No. 11/773,617, entitled "DOWNDRAFT GASIFIER WITH INTERNAL CYCLONIC COMBUSTION CHAMBER", filed Jul. 5, 2007.

This application claims the priority of U.S. Provisional Patent Application No. 61/076,180, entitled "GASIFICATION OF SWITCHGRASS USING A DOWNDRAFT REACTOR," filed Jun. 27, 2008, the contents of which are hereby incorporated by reference.

STATEMENT REGARDING FEDERALLY SPONSORED RESEARCH OR DEVELOPMENT

This invention was made with U.S. Government support under USDA/CSREES Grant No. 00-52104-9662, USDA/CSREES Grant No. 2001-34447-10302, USDA/CSREES Grant No. 2002-34447-11908, USDA/CSREES Grant No. 2003-34447-13162, USDA/CSREES Grant No. 2004-34447-14487, USDA/CSREES Grant No. 2005-34447-15711, USDA/CSREES Grant No. 2006-34447-16939, and USDA/CSREES Grant No. 2008-34447-19201 awarded by the Department of Agriculture and under DOT/OST Grant No. DTOS59-07-G-0053 awarded by the Department of Transportation. The Government has certain rights in the invention.

FIELD OF THE INVENTION

This disclosure relates to gasification of biomass materials in general and, more specifically, to gasification by downdraft gasifiers.

BACKGROUND OF THE INVENTION

Biomass may be converted into useful gas products such as carbon monoxide (CO), carbon dioxide ($CO_2$), hydrogen ($H_2$), and others. There are multiple processes by which the raw biomass materials may be gasified. These include pyrolysis, tar cracking, and char gasification. Heating the biomass material under the proper circumstances such that the desired gases are released without being oxidized or otherwise consumed is one commonality among certain of the various gasification methods.

In order to obtain useful quantities of gases from raw biomass material, the gasification process must be implemented in such as way as to operate in a steady state. The desirable gases, or production gases, should more or less be output at a steady rate. Improper handling and processing of the biomass can result in a suboptimal amount of the raw biomass being gasified. Unacceptably high levels of undesirables can also be produced and taint the output gases if the production process is not controlled.

SUMMARY OF THE INVENTION

The invention disclosed and claimed herein, in one aspect thereof, comprises a downdraft gasifier. The gasifier includes a biomass section that accepts and stirs raw biomass materials, a pyrolysis and tar cracking section having an inner cylinder for receiving biomass and an outer surrounding cylinder for gases from the biomass, and a char gasification section for receiving biomass and gases from the pyrolysis and tar cracking section. The char gasification section provides a grating and scraper for passing gases and ash and retaining biomass for char gasification on the grate.

In some embodiments, the biomass section is arranged superior to the pyrolysis and tar cracking section, and the pyrolysis and tar cracking section is arranged superior to the char gasification section. In some embodiments, the inner cylinder defines a plurality of perforations on at least a portion thereof. A biomass feeding unit may selectively provide biomass through an airlock to the biomass section.

A cyclone separator may remove particulate from the gas leaving the char gasification section. An ash chamber may be provided below the char gasification section that catches ash and solid matter falling through the grate. An ash conveyor may remove ash from the ash chamber to a remote ash chamber.

DETAILED DESCRIPTION OF THE PREFERRED EMBODIMENTS

Figure 1:
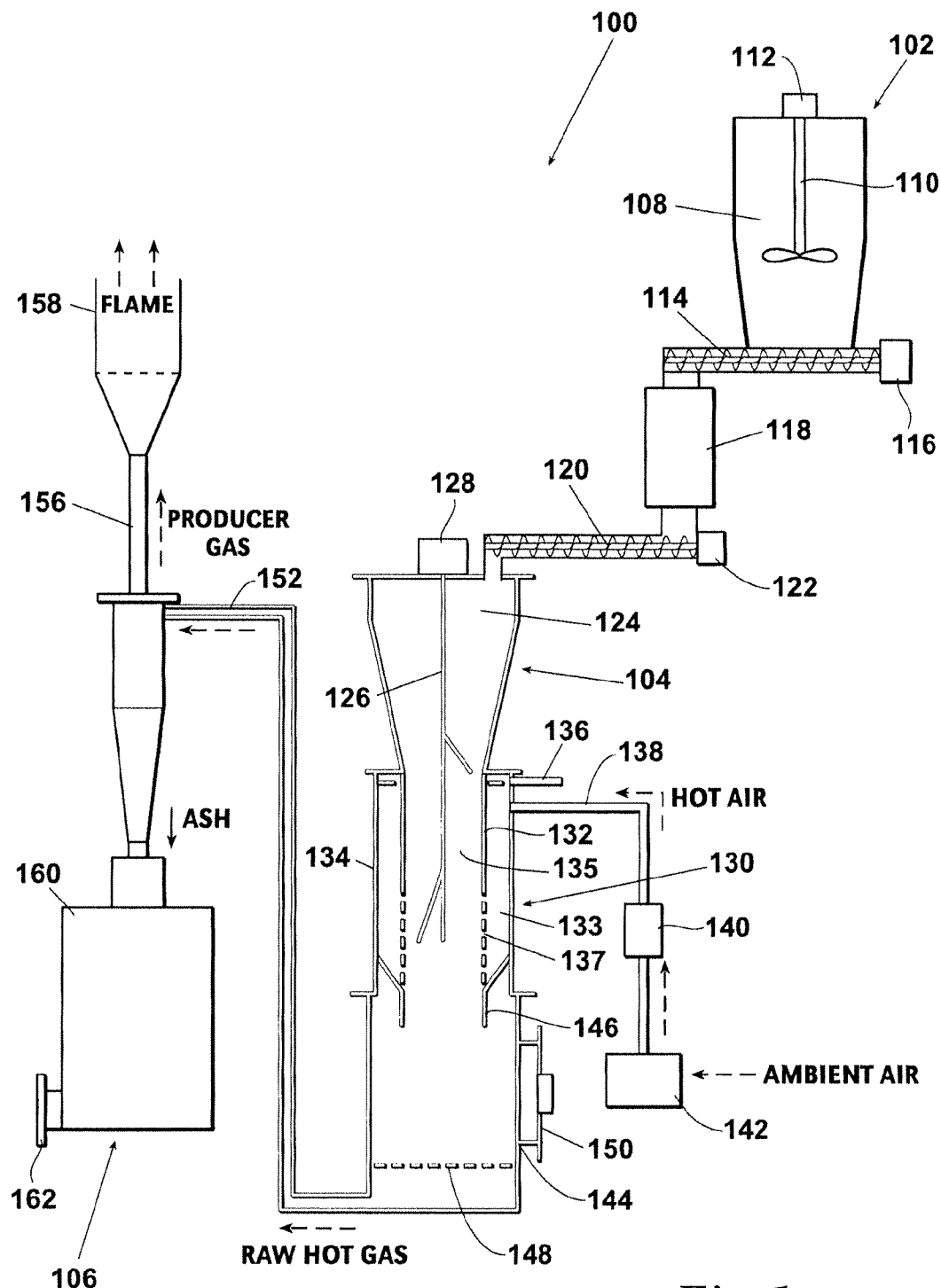
FIG. 1 is a schematic diagram illustrating one embodiment of a gasification system according to aspects of the present disclosure.

Referring now to FIG. 1, a schematic diagram illustrating one embodiment of a gasification system according to aspects of the present disclosure is shown. The gasifier system 100 comprises three primary components: a biomass feeding unit 102; a combustion chamber 104; and a separator 106. These primary components may further comprise a number of sub-components, which will be described in detail below. The system 100 is operable to accept biomass as an input product and provide useful gases as an output product. The producer gas may be a mixture of carbon monoxide (CO), carbon dioxide ($CO_2$), hydrogen ($H_2$), and possibly other gases. In one embodiment, the gasification system 100 operates to convert biomass material into the desired gases by means of pyrolysis and tar cracking. This result may be achieved by creating high temperatures within the combustion chamber 104. This causes the biomass material to break down into a number of materials, including ash and gases.

The biomass feeding unit 102 accepts the biomass intake product for processing by the system 100. Biomass materials suitable for use with the system 100 may include, but are not limited to, woodchips, sewage or sludge, and refuse from the processing of plant matter. The gasification system may also operate using input biomass from plants grown with the specific purpose of being fed into the gasification system 100.

The biomass feeding unit 102 comprises a hopper 108 and an agitator 110 with an agitator drive unit 112. The dimensions and specific shape of the hopper 108 may vary in accordance with the needs of the end user. In the present embodiment, the hopper 108 has a tapered cylindrical shape. The agitator 110 may be a bladed or impellor type agitator or another type of agitator suitable for the biomass used with the gasification system 100. It is also understood that stirrers, conveyors, or other implements could be used to ensure ready delivery of biomass material into the gasifier 100. In the present embodiment, where the agitator 110 is a rotational agitator, the agitator drive unit 112 may be selected according to the duty cycle and torque requirements necessary to agitate the chosen biomass material. Some embodiments will provide a variable speed agitator. The agitator may be selectively operable such that it operates only when needed to insure proper feeding of the biomass.

In the present embodiment, a screw drive 114 serves to move biomass from the hopper 108 to an airlock 118. In the present embodiment, a screw drive 114 is powered by a screw drive powering unit 116. The screw drive powering unit 116 may be pneumatic, electrical, or powered by another source. The screw drive may be selectively operable and/or of variable speed so that feeding of the biomass may be properly controlled. In other embodiments, the screw drive 114 may be replaced with other conveyance means, such as conveyor belt, a slip stick movement device, or another suitable conveyance.

The air lock 118 serves to control the intake of biomass from the hopper 108 to the rest of the gasification system 100. The air lock 118 also serves to prevent back flow of the gases from combustion chamber 104. The airlock 118 may be electrically or mechanically powered. The airlock 118 may be remotely controllable, such as with an electronic relay.

Beyond the airlock 118 is another screw drive 120. The screw drive 120 is powered by another screw drive power unit 122. These may be similar to the screw drive 114 and screw drive powering unit 116. As before, in embodiments other than the one shown in FIG. 1, the screw drive 120, as well as the screw drive powering unit 122, could be replaced with other conveyance means. In some embodiments, the airlock 118, agitator 110, and the screw drives 114, 120 will operate in concert to ensure proper delivery of biomass to the combustion chamber 104.

When the biomass material leaves the biomass feeding unit 102, it is fed into the combustion chamber 104. The combustion chamber 104 provides a number of additional steps in the gasification process, which will be described in more detail below. A biomass section 124 may be provided near the top of the combustion chamber 104. In one embodiment, the biomass section 124 serves to guide or direct the entering biomass material into the remainder of the combustion chamber 104.

A stirrer 128 may be provided starting at the biomass section 124. The stirrer may proceed further into the depths of combustion chamber 104. The stirrer 126 may be made from a suitably heat resistant material able to withstand high temperatures necessary in the combustion chamber 104. Blades or other agitating means may be provided on the stirrer 126. The stirrer 126 is powered by a stirrer drive unit 128. The stirrer drive unit may once again be electrical, pneumatic, mechanical or powered by another source. The biomass section 124 may be cylindrical, conical, or may have another shape. In one embodiment, the shape of the biomass section 124 serves to feed biomass material at the appropriate speed and volume down into a tar cracking section 130.

The tar cracking section 130 may be generally cylindrical in shape and may provide an inner chamber 135, defined by an inner cylindrical wall 132. The inner wall 132 and an outer wall 134 may define an annular outer chamber 133. It can be seen that the inner wall 132 may also feature perforations 134 that aid in the heating of the biomass material. As solid biomass in the inner chamber 135 ispyrolysed, the gases may escape the inner chamber 135 through the perforations 134 in the inner wall 132 into the annular chamber 133.

It can be seen that, in the embodiment shown, the stirrer 126 proceeds at least part of the way through the inner chamber 135. In this way, stirring or agitation is provided starting at the biomass section and proceeding through at least a portion of the tar cracking section 130. This reduces and/or eliminates hot spots that would prevent efficient pyrolysis and tar cracking within the combustion chamber 104.

In the present embodiment, the combustion chamber 104 is heated in part by the combustion of propane. The propane heating may only be necessary to initiate the gasification process. In the present embodiment, propane enters through the fuel inlet 136 into the combustion chamber 104 where it may be ignited to produce heat. Although propane is used in the present example, it is understood that other fuel sources may be utilized, including but not limited to, natural gas, refined fuels, and other petroleum products.

It may be important to carefully control oxygen content within the combustion chamber 104. An air inlet 138 is provided for oxygenating the environment of the combustion chamber 104. An additional function of the air inlet 138 may be to provide heated air for furthering the gasification processes of the system 100. Some embodiments will provide a heater 140 for preheating the air entering the combustion chamber 104. The heater 140 may be gas or electrical powered or, in some embodiments, may be based off of the waste heat generated by another outside process. In some embodiments, the heater 140 will preheat the air to up to 300° C. or greater. A compressor 142 may also be provided for delivering the air into the combustion chamber 104 at the appropriate pressure. Pressurizing the ambient air will also heat the air to a certain degree, which may be useful in the gasification process. The compressor 142 can be electrical, pneumatic, or powered by another source. In the present embodiment, the heater 140 follows the compressor 142 resulting in higher efficiencies resultant from the heater 140 operating on compressed, and therefore hotter, air.

Various components of the system 100, may be insulated for increased efficiency or productivity. For example, the air inlet 138 may be insulted. Similarly, all or a portion of the combustion chamber 104 may be insulated. In one embodiment, a ceramic wool blanket insulation (not shown) of about 25 mm thickness will be utilized. In other embodiments, different materials that are suitably heat resilient may be utilized. Additionally, the thickness of any insulation used may be varied based upon a number of factors including the desired reaction temperature, the ambient air temperature, efficiency concerns, and others.

Below the tar cracking section 130 is a char gasification section 144. In the present embodiment, the char gasification section 144 is separated from the tar cracking section by an annulus 146. This component may be optional depending upon the nature of the biomass material being utilized. In the present embodiment, the annulus 146 serves to guide the partially gasified biomass into the char gasification section 144.

The biomass material in the char gasification section 144 falls down onto a grating 148. The grating 148 serves as a separation step to separate the solid material from the gases created in the combustion chamber 104. It can be seen that the raw gases and ash are allowed to escape via a conduit 152 and travel to the separator 106. The remaining solid biomass material will remain trapped by the grating 148 where additional char gasification will occur. As the biomass further gasifies, the ash and gases produced will pass through the grating and out the conduit 152.

It can be seen in FIG. 1 that the biomass section 124, the tar cracking section 130, and the char gasification section 144 may be arranged in a generally vertical fashion. The present embodiment provides the tar cracking section 130 in between the biomass section 124 and the char gasification section 130. In this configuration, gravity may serve to feed the biomass through the combustion chamber resulting in down draft type gasification process. The combustion and gasification in the combustion chamber 104 may serve to create swirls, vortices, and other cyclonic gas flows. These may be controlled and/or aided by the stirrer 126 and perforations 133 in the inner chamber wall 132 of the tar cracking section 130. This serves to prevent cold spots in the combustion chamber 104, particularly as the size of the process is scaled up.

The configuration of the combustion chamber 104 also helps to ensure substantially complete transformation of the biomass material into gases and ash. The gases will include producer gas and possibly waste gas. The ashes will contain substantially no organic material. Nevertheless, as a practical consideration, means may be provided for clearing any solid material captured on the grating 148 that is not consumed by char gasification. In one embodiment, this may be an access portal 150 located near the grating 148 on the char gasification section 144 of the combustion chamber 104. The access portal 150 may also allow for servicing, inspection, and/or replacement of the grating 148 and other components on the interior of the combustion chamber 104.

The separation section 106 provides a separator 154 for separating the production gas from the ash in the raw gas stream coming from the conduit 152. In one embodiment, the separator 154 is a cyclonic separator, but other separators may be utilized. The separator may be mechanical and may be electrically, pneumatically, or otherwise powered. The separated production gas is removed by the outlet 156. The present embodiment illustrates a burner 158 that consumes the production gas coming from the outlet 156. Thus, heat and other power may be provided for another process. However, it is understood that the production gas may be stored, utilized in a different manner, or further refined downstream of the gasification system 100. A storage chamber 160 is provided for catching and/or holding the ash from the separator 154. The ash may be useful in other processes and can therefore be retained until needed. In the present embodiment, an access portal 162 is provided for periodically removing the ash from the storage chamber 160. It is understood, however, that other means may be utilized, such as conveyor belts or screw drives.

Figure 2:
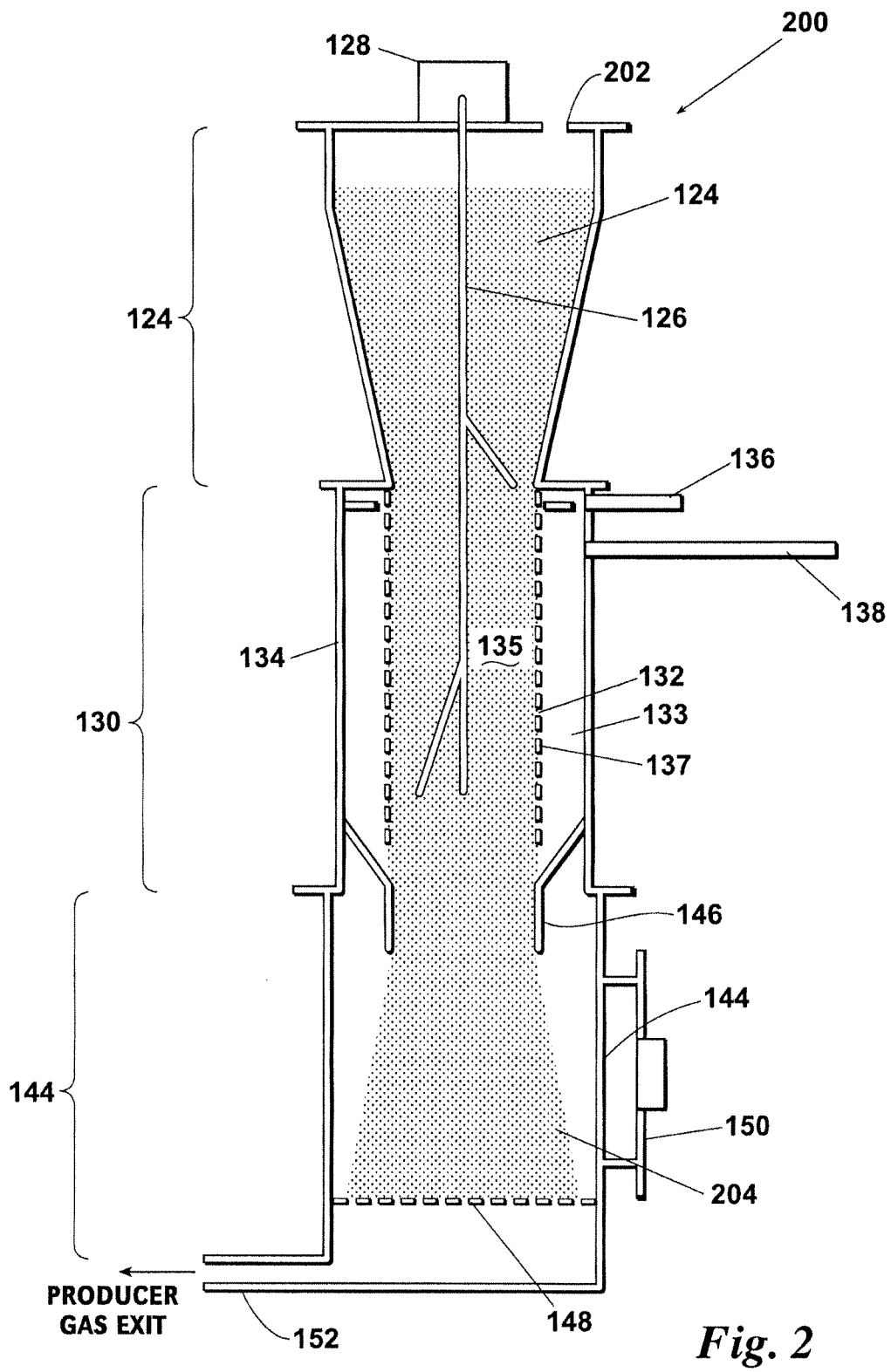
FIG. 2 is a schematic diagram illustrating one embodiment of a gasification combustion chamber for use with the gasification system of FIG. 1.

Referring now to FIG. 2, a schematic diagram illustrating one embodiment of a gasification combustion chamber for use with the gasification system of FIG. 1 is shown. It should also be noted that this combustion chamber may also be utilized with the gasification system of FIG. 6 discussed below. It can be seen that the combustion chambers 200 and 104 are similar. Once again, a three-section embodiment is shown. The sections or chambers include the biomass section 124, the tar cracking section 130, and the char gasification section 144. A stirrer 126 is provided, driven by a stirrer drive unit 128. The fuel inlet 136 is shown, along with the air inlet 138. A grating 148 is provided near the bottom end of the char gasification section 144. Gases and ash escape through the gas conduit 152. It will be appreciated that the combustion chamber 200 may be utilized in the gasification system 100 of FIG. 1, directly replacing the combustion chamber 104 illustrated in FIG. 1.

As has been described, in one embodiment biomass is provided to the combustion chamber 200 through a biomass feeding unit. Biomass enters the combustion chamber 200 through an inlet 202. In FIG. 2, a biomass column 204 is illustrated to show one possible route for the biomass material through the combustion chamber 200. It can be seen that the stirrer 126 may serve to stir the biomass 204. As before, propane gas is introduced through the inlet 136. In the present embodiment, the propane is supplied near the top of the tar cracking section 130, and is used only for initial firing at start up of the process.

The tar cracking section 130 is once again formed by inner cylindrical walls 132 and an outer cylindrical wall 134. An inner chamber 135 is bounded by the inner wall 132 and an annular chamber 136 is formed between the inner wall 132 and outer wall 134. In the present embodiment, the entirety of the inner chamber 132 is provided with perforations 134. Various degrees of perforation of the inner chamber 132 may be utilized depending upon the raw biomass material being utilized. Some embodiments may provide for an adjustment of the degree of perforation using a sleeve or other means, for example. In the present embodiment, tar loaded pyrolysis gases are allowed to escape from the biomass 204 column through the perforations 134 where they are mixed with preheated air from the air inlet 138. The pressurized gas entering the tar cracking section 130 provides high temperature turbulence and swirling combustion flows, allowing tar cracking to occur.

The high temperature combustion products being produced in the tar cracking section 130 feed through the annulus 146 into the char gasification section 144. In the present embodiment, the char gasification section 144 provides for additional biomass decomposition by char gasification reactions. In some embodiments, temperatures of up to 1200° C. are attained in the char gasification section 144.

It can thus be appreciated that biomass entering the combustion chamber 200 will undergo a continuous process whereby the gasification process begins as early as the biomass section 124. As the biomass is consumed, it is allowed to fall with the aid of the stirrer 126 into the tar cracking section where a majority of the pyrolysis of the process may occur. As the partially consumed biomass exits the tar cracking section 130, it is allowed to fall downward into the gasification chamber 144 where it may land on the grating 148. In some embodiments, the reaction of remaining biomass in the column 204 continues on the grating 148. Gases and heat escaping downward through the combustion chamber 104 and out through the conduit 152 provide energy for the char gasification process on the grating 148. Thus, a substantially complete reduction process will occur such that gases and essentially inorganic material, or ash, are allowed to flow freely through the conduit 152.

Table 1 shows the characteristics of pine wood pellets that may be used as a feedstock (biomass) for operation of the gasification system of the present disclosure. Table 2 illustrates a summary of a number of gasification tests conducted utilizing a system constructed in accordance with FIG. 1. The table includes the temperatures reached by various locations within the system 100, as well as the gases produced in percentage by volume thereof. It can be seen that, in some of the tests, tar content and particulates were measured. Efficiency and mass balance percentages are also shown. The mass balance percentages may not add up to exactly 100 due to measurement limitations and rounding errors in equipment.

Figure 3:
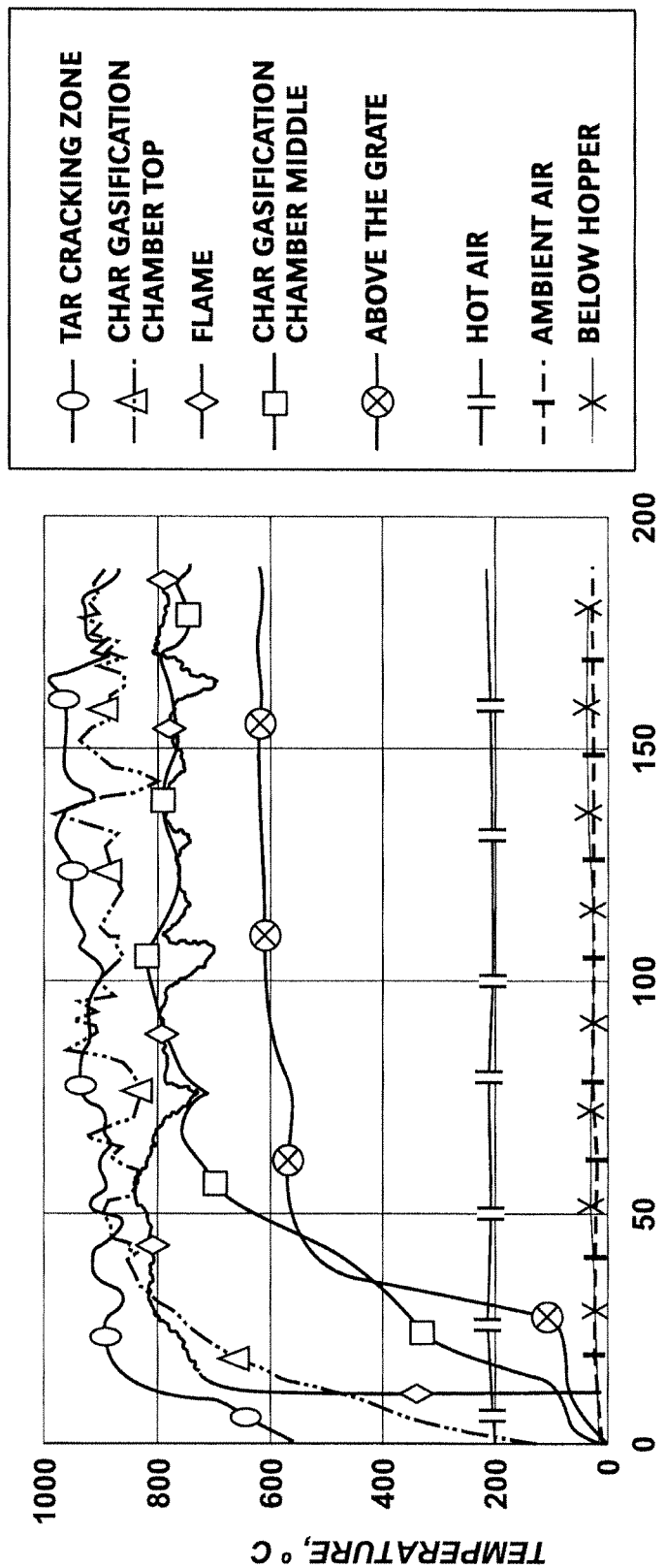
FIG. 3 illustrates an exemplary temperature profile of a downdraft gasifier constructed according to FIG. 1.
Figure 4:
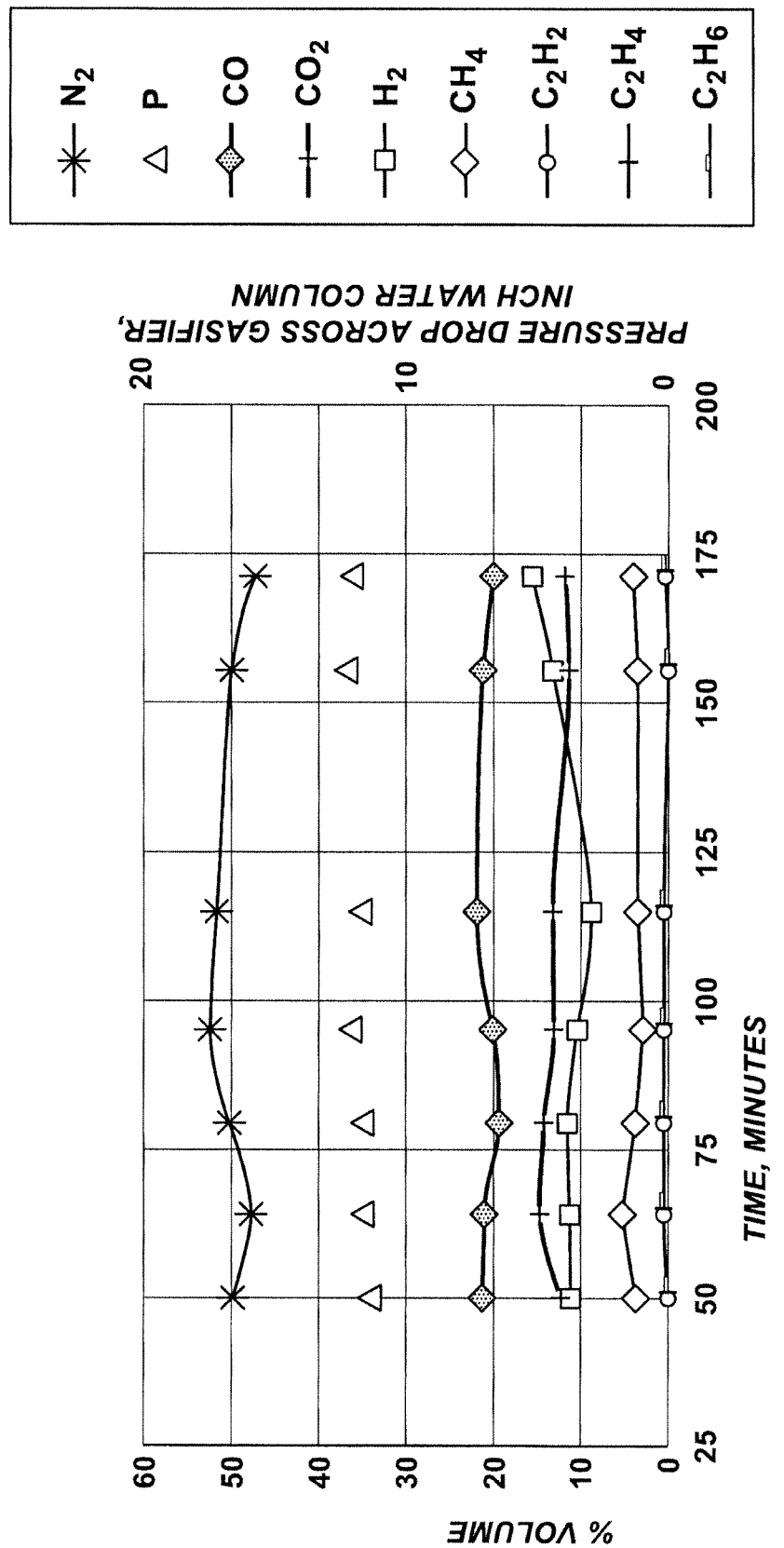
FIG. 4 illustrates the pressure drop and volumetric concentrations of various output gases from a gasifier constructed according to FIG. 1.

Referring now to FIG. 3, an illustration of an exemplary temperature profile of a downdraft gasifier constructed according to aspects of the present disclosure is shown. The measurements of FIG. 3 were taken with a gasifier built according to the present disclosure. Referring also to FIG. 4, the pressure over time of various output gases from the gasifier is shown. With reference to FIGS. 3 and 4, it can be seen that within 60 min from system start time, the gasifier system operation was stabilized. FIG. 4 reveals that, throughout the test period of three hours, concentration levels of all gases were stable. The present embodiment produces gases with a heating value in the range of 1277 to 1423 kcal/m$^3$. Volumetric CO, $H_2$, and $CO_2$ concentrations are in the range of 21-23%, 11-13%, and 13-13.5% percent, respectively. Tar cracking zone temperatures were maintained close to 1000° C. Hot gas efficiency ranged from 63 to 81 percent. Average producer gas flame temperatures were approximately 780° C. Tar and particulate contents in the raw producer gas were in the range of 5 to 12 g/m$^3$ and 0.4 to 0.45 g/m$^3$, respectively. It can be seen that the results corresponding to the performance of a gasifier constructed according to the present disclosure are comparable to the performance of a conventional throat type downdraft gasifier. This relationship is illustrated for reference in Table 3.

Figure 5:
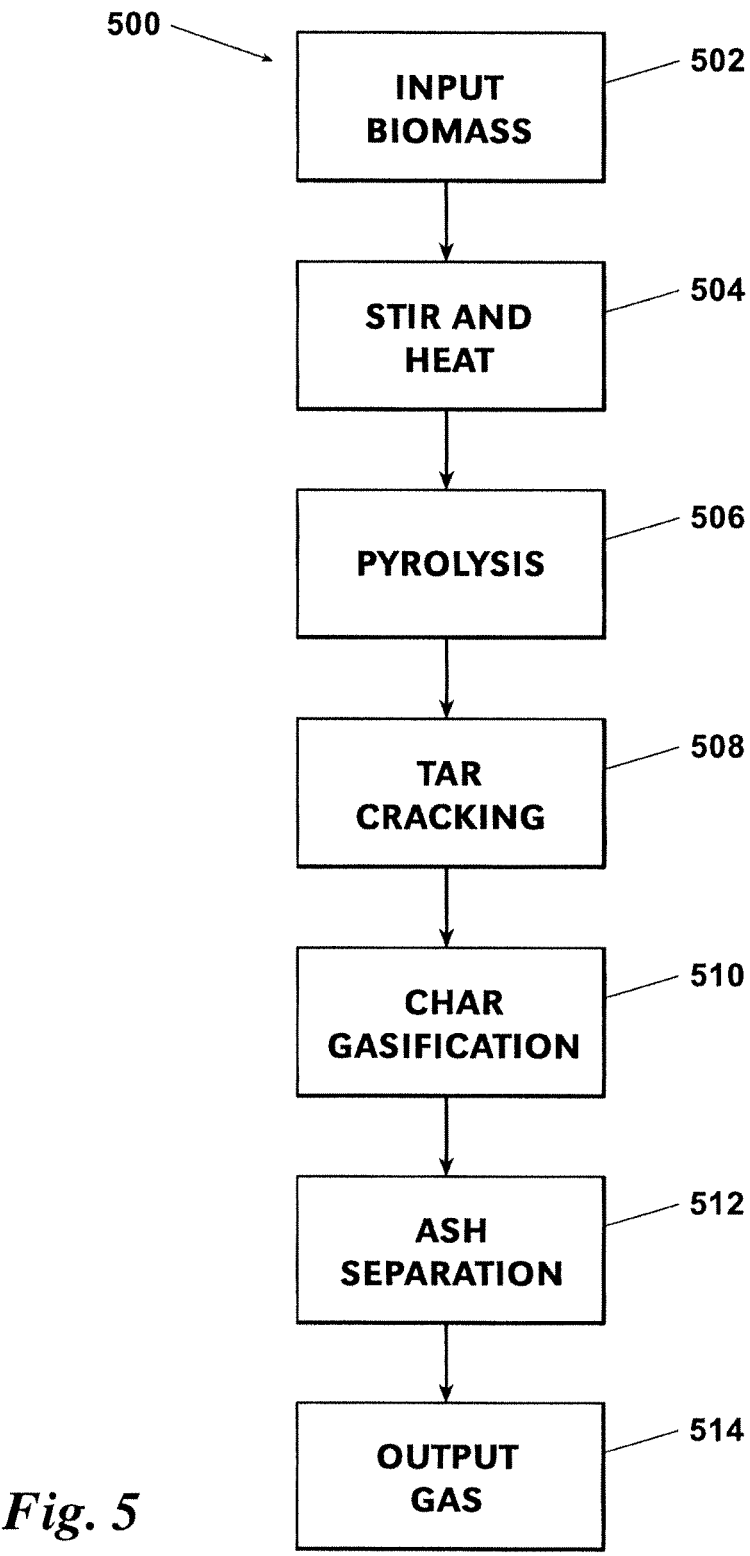
FIG. 5 is a flow diagram illustrating an embodiment of a gasification process according to the present disclosure.

Referring now to FIG. 5, a flow diagram illustrating one method of a gasification process according to the present disclosure is shown. FIG. 5 illustrates a simplified version of one gasification method that may be accomplished by the systems of the present disclosure. At step 502, biomass is input to the system. At step 504, the biomass will be stirred and heated. Stirring could be done in a biomass chamber, for example. Heating could be accomplished by a propane flame and/or heated air, or by other means. Pyrolysis begins at step 506. However, it is understood that stirring and heating may continue even as pyrolysis occurs.

At step 508 tar cracking occurs. As before, it is understood that pyrolysis may still be occurring when tar cracking has begun. Stirring and heating of the biomass as shown at step 504 may also still be occurring. With reference back now to FIG. 1, it can be seen in the combustion chamber 104 of the system 100 that stirring and heating at 504, pyrolysis at step 506, and tar cracking at step 508 may be simultaneously and/or continuously occurring.

Char gasification begins at step 510. Although char gasification is illustrated as the last of the actual gasification steps, referring again to FIG. 1, it will be clear that the char gasification at step 510 can occur simultaneously with stirring and heating at step 504, pyrolysis at step 506, and/or tar cracking at step 508.

Following the reduction of substantially all of the biomass through pyrolysis, tar cracking, and/or char gasification, the raw gases will be separated from the ash contained therein at step 512. Following removal of the ash at step 512, the gas may be output at step 514. As previously described, the output gas may have a number of uses, such as immediate consumption, storage, and/or further refining.

Figure 6:
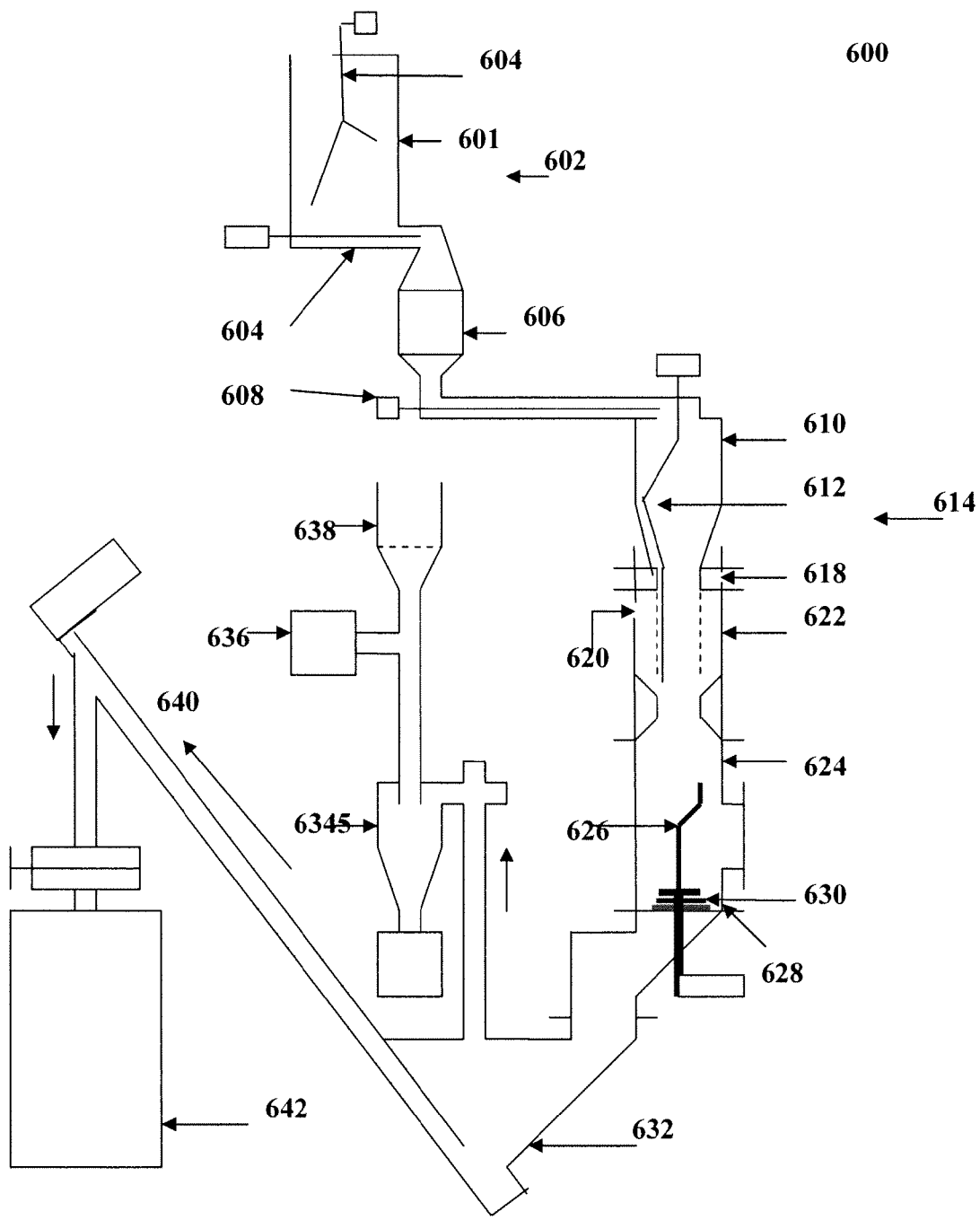
FIG. 6 is a schematic diagram illustrating another embodiment of a gasification system according to aspects of the present disclosure.

Referring now to FIG. 6, a schematic diagram illustrating another embodiment of a gasification system according to aspects of the present disclosure is shown. It can be seen that the system of FIG. 6 is similar in some regards to the system of FIG. 1 described above. Differences between the embodiments will be discussed herein. The gasifier system 600 comprises a biomass feeding unit 601, a multi-stage combustion chamber 614'; and a separator 634. Combustion chamber 614 has an inner lining of high temperature refractory. The biomass feeding unit 601 comprises a hopper 602 and a stirrer 604. The hopper 602 of the present embodiment is cylindrical in shape.

A screw drive 604 serves to move biomass from the hopper 602 to an airlock 606. As with previous embodiments, the air lock 606 serves to control the intake of biomass from the hopper 601 to the rest of the gasification system 600 and serves to prevent unwanted gases (e.g., air) from entering the combustion chamber 614. Another screw drive 608 delivers biomass to the combustion chamber 614. As with previous embodiments, the screw drives could be replaced with other conveyance means and may be air powered, electrically powered, or power by other mechanical means.

In the present embodiment, the gasification reactor or combustion chamber 614 comprises a biomass section 610 near the top, a pyrolysis and tar cracking (PTC) zone 622 near the middle, and a char gasification chamber 624 near the base. Similar to previous embodiments discussed with regard to FIGS. 1 and 2, the PTC zone 622 comprises a twin cylinder unit extended downward to the top of the gasification chamber 624 with an annular space between the cylinders. The inner cylinder is perforated and holds the biomass column. Tar-loaded pyrolysis gases enter into the annular space. Air (possibly compressed and/or heated as in FIG. 1) enters an inlet 620 and is tangentially mixed with the pyrolysis gases. High temperatures in the PTC zone 622 also facilitate biomass pyrolysis. Propane gas, or other fuel, may be supplied at a gas inlet 618 near the top of the PTC zone 622 for initial firing.

A suitably heat resistant stirrer 612 may be provided starting at the biomass section 605 and proceed into the PTC zone 622. It can be seen that, in the embodiment shown, the stirrer 126 proceeds at least part of the way through the inner chamber 135. In this way, stirring or agitation is provided starting at the biomass section 610 and proceeding through at least a portion of the PTC zone 622. This reduces and/or eliminates hot spots that would prevent efficient pyrolysis and tar cracking within the combustion chamber 104. Various components of the system 600 may also be insulated for increased efficiency or productivity. For example, in the present embodiment, the gasification reactor 614, piping, and a cyclone separator 634 are insulated with a 25-mm thick ceramic wool blanket.

The char gasification section 624 may be separated from the PCT zone 622 by an annulus 623. In the present embodiment, the annulus 623 serves to guide the partially gasified biomass into the char gasification section 624. In the present embodiment, the biomass material in the char gasification section 624 may be stirred by a stirrer 626. This may help break up any large chunks of biomass material remaining as the biomass falls down onto a grating 628. The grating 628 serves as a separation step to separate the solid material from the gases created in the combustion chamber 104. The grating 628 may be a wire mesh and may also be provided with a rotating scraper 630. The rotating scraper may provide a circular opening in the center (not shown). Remaining biomass material may be further reduced to gases and ash on the grating 628.

Raw gases and ash will pass through the grating 628. Ashes will tend to fall into the ash chamber 632 while gases may be drawn into the cyclonic separator 634. Here, particulates remaining in the gas stream may be removed. Separated production gas may be consumed by a burner 158. Thus, heat and other power may be provided for other processes. However, it is understood that the production gas may be stored, utilized in a different manner, or further refined downstream of the gasification system 600.

A tar and particulate measurement system 636 may be provided for monitoring the gases leaving the cyclonic separator 634. Further testing of the producer gas can be conducted using a device such as a gas chromatograph. In order to properly monitor and control the system 600, various other sensors may be placed at needed locations. Without limitation, these may include temperature and pressure probes, mass flow meters, thermocouples, and rotational sensors.

Ash that is collected in the ash chamber 632 may be removed by screw conveyor 640 to a remote ash storage chamber 642. Here the ash may be stored until discarded or removed for use in another process.

The embodiment of FIG. 6 should increase CO and $H_2$ concentrations and reducing $CO_2$ relative to other gasification methods. For testing of the device shown in FIG. 6, switchgrass, at approximately 11.6% dry basis moisture content, was chopped using a Haybuster H-1000 tub grinder (DuraTech Industries International, Inc. Jamestown, N.D.) using a screen with a 25-mm hole size. For bulk density determination, the material was poured into a 473-ml container from 100 mm above the container. The bulk density was determined by dividing the weight of the material by the container volume. Biomass proximate and ultimate analyses were performed by Hazen Research Inc, Golden, Colo.

Test preparation started with loading 5 kg of wood charcoal onto the grate 630. The gasification reactor 614 was then completely filled with chopped switchgrass. The hopper 602 was also kept full with the biomass. The gasifier 600 was preheated using propane for about five minutes. When the temperature in PTC zone 622 reached approximately 600° C., preheating was discontinued. The desired air flow was then set. Within thirty minutes, the reactor temperature profile stabilized.

During each test, biomass fuel level in the gasification reactor 614 was maintained by intermittently operating the biomass feeding system 601. Reactor temperature profile, temperature of the producer gas at the exit of the cyclone reactor and that of the flame, pressure drops across the gasification reactor and the whole system, air flow rate, and amount of biomass loaded before and during the tests were closely monitored. The maximum test duration was six hours. Producer gas sampling began once the system was stabilized as indicated by the reactor temperature profile. For gas analysis, samples were taken every 10-15 minutes. At the end of each experiment, solid residues remaining in the reactor and in the particulate chamber and the biomass remaining in the hopper were quantified to estimate the fuel consumption rate and to determine the overall mass balance. Gas flow rate was determined by a nitrogen balance. The gas calorific values were determined using the volumetric gas composition values from gas chromatograph and the theoretical heating values of all the combustible components. Gasifier efficiencies, equivalence ratios and mass balances were calculated as follows:

$$CGE = [PCE/(DBE+ASE)]*100 \quad \text{Eqn. 1}$$

$$HGE = [(PCE+PSE)/(DBE+ASE)]*100 \quad \text{Eqn. 2}$$

$$ER = AIR/(DBIR*STADB) \quad \text{Eqn. 3}$$

Where,
CGE=Cold gas efficiency, %
HGE=Hot gas efficiency, %
ER=Equivalence ratio
PCE=Chemical energy in dry producer gas, kcal/h
PSE=Sensible energy in dry producer gas, kcal/h
DBE=Dry biomass energy, kcal/h
ASE=Hot air sensible energy, kcal/h
AIR=Air input, $Nm^3/h$
DBIR=Dry biomass input, kg/h
STADB=Stochiometric air requirement for dry biomass, $Nm^3/kg$ of dry biomass $$\text{Mass balance, \%} = (\text{Total mass out/Total mass in})*100 \quad \text{Eqn. 4}$$

Table 4 shows the characteristics of switchgrass used in the study. Chopped switchgrass is a low bulk density biomass with ash content and elemental composition comparable to most of the crop residues. Low bulk density poses major challenge to ensure proper material flow in the reactor and the hopper. Agitators have been used to facilitate the material flows in the biomass hopper and the gasification reactor.

Figure 7:
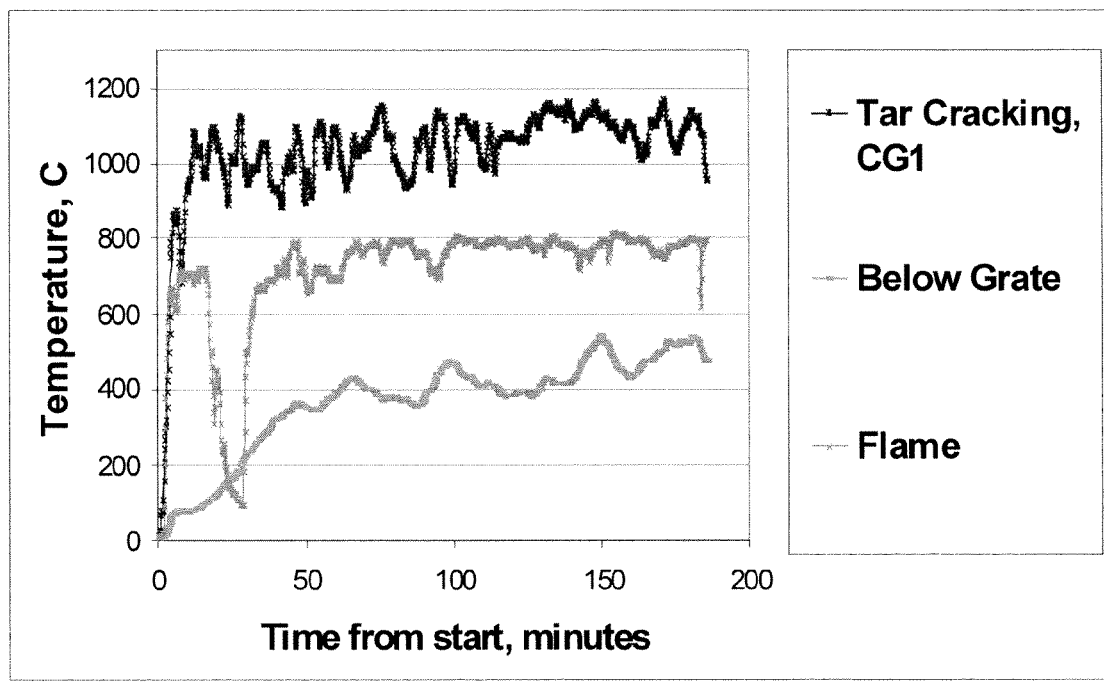
FIG. 7. illustrates a temperature profile of the gasification system of FIG. 6.
Figure 8:
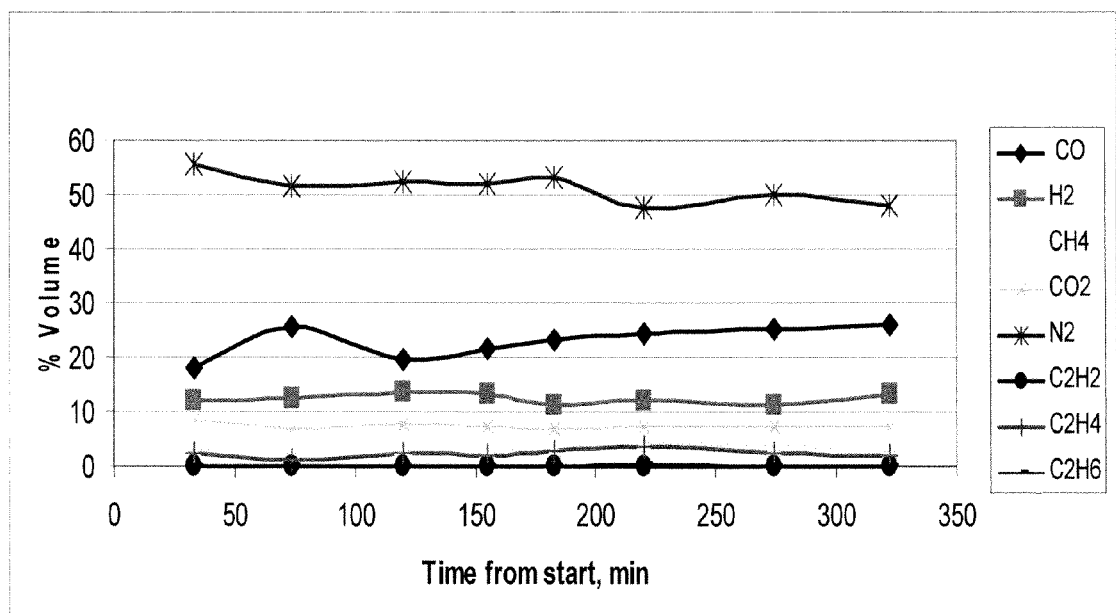
FIG. 8. illustrates the variation of gas composition with time for the gasifier of FIG. 6.

The major operating parameters and results of the gasification tests are presented in Table 5. FIGS. 7 and 8 show typical cases of temperature and gas composition profiles. Within one hour from system start-up, the gasifier operation was stabilized. The tar cracking temperatures were between 1003 and 1110° C. Gas components of greatest interest (volume basis) were CO: 19.2-24.4%, $H_2$: 9.7-12.0%, $CO_2$: 7.9-13.7% and $CH_4$: 2.5-4.5%. Dry product gas yield ranged from 1.7 to 1.8 $Nm^3/kg$ dry biomass. Specific gasification rates varied from 507 to 736 $m^3/h$ of dry gas per square meter combustion zone area. Hot gas and cold gas efficiencies were: 63-89% and 52-78%, respectively. Average producer gas flame temperatures were around 8000C. The lower heating value of the gas ranged from 1160 to 1673 $kcal/Nm^3$.

Among the four levels of specific air input rates (kg of air/h-sq. m of combustion zone area) tested to date, 542 kg/h-sq. m of combustion zone area resulted in the highest system performance: average values for hot gas and cold gas efficiencies of 89% and 72% respectively; lower heating value of gas: 1566 $kcal/Nm^3$; and CO, $H_2$ and $CO_2$ concentrations: 23%, 12% and 9%, respectively. The corresponding average specific gasification rate was 663 cu. m dry gas/h-sq. m of combustion zone area. As the specific air input rate increased to 647 kg/h-sq. m of combustion zone area, $CO_2$ concentration increased 14% while the CO and $H_2$ concentrations decreased (19 and 10% respectively). The average lower heating value of gas also decreased up to 1160 $kcal/Nm^3$. The corresponding specific gasification rate was 736 cu. m dry gas/h-sq. m of combustion zone area. Specific air input rate of 542 kg of air/h-sq. m of combustion zone area provided optimal reaction environment in the gasifier for $CO_2$ and water vapor reactions with carbon, and as a result produced gas with higher levels of CO and $H_2$ concentrations. At this level of specific air input, the gas tar and particulate content at the gasifier exit were: 18 and 2.5 $g/Nm^3$, respectively. For wood pellets based gas these values were 5-12 $g/Nm^3$ and 0.4-0.45 $g/Nm^3$, respectively [4].

Lower bulk density and higher volatiles in the chopped switchgrass as compared to wood pellets, is one reason for higher levels of tars. Another major reason for higher levels of tars in the gas is the shifting of high temperature zone downward below the PTC section 622 because of the low density nature of the chopped biomass. In general, the system performance was consistently good regarding CO and $H_2$ concentrations and gasification efficiencies as shown in Table 5. The differences in the mass balance closure figures is attributed to measurement errors in collection and quantification of the incoming and outgoing streams of the gasifier system.

Among the four levels of specific air input rates, a level of 542 kg/h-sq. m of combustion zone area resulted into highest performance: average values for hot gas and cold gas efficiencies of 82% and 72% respectively; lower heating value of gas: 1566 $kcal/Nm^3$; and CO, $H_2$ and $CO_2$ concentrations: 23%, 12% and 9%, respectively. The corresponding average specific gasification rate was 663 cu. m dry gas/h-sq. m of combustion zone area.

As the specific air input rate increased to 647 kg/h-sq. m of combustion zone area, $CO_2$ concentration increased 14% while the CO and $H_2$ concentrations decreased 19 and 10% respectively. CO and $H_2$% increased up to 24% & 12% (by volume), respectively while $CO_2$% decreased from earlier concentration of 18% to 8%.

TABLE 1

Wood pellet characteristics

| Proximate, (weight %, dry basis) | |
|---|---|
| Moisture content | 7.5 ± 0.1 |
| Volatile matter | 82.2 ± 0.6 |
| Fixed carbon | 17.6 |
| Ash | 0.2 ± 0.03 |
| Higher heating value, kcal/kg[a] | 5075 |
| Ultimate[a] (weight %, dry basis) | |
| Carbon C | 52.13 ± 1.7 |
| Hydrogen H | 6.36 ± 0.3 |
| Oxygen O | 41.23 |
| Nitrogen N | 0.07 ± 0.03 |
| Sulphur S | 0.01 |
| Diameter (mm) | 6.0 |
| Length (mm) | 10-35 |
| Bulk density (kg/m$^3$) | 660 |

[a]BIOBIB. 1992. A database for biofuels. Available at: www.vt.tuwien.ac.at/Biobib/biobib.html. Accessed 8 May 2006.

TABLE 2

Summary of typical gasification operation

| | Test 1 | Test 2 | Test 3 | Test 4 |
|---|---|---|---|---|
| Equivalence ratio | 0.18 | 0.21 | 0.23 | 0.17 |
| Fuel feed rate, kg/h | 17.0 | 14.8 | 13.0 | 18.1 |
| Input air temperature, C. | 216 ± 4 | 205 ± 3 | 216 ± 17 | 219 ± 4 |
| Tar cracking zone (TCZ) temperature, (Ave.), C. | 854 ± 43 | 896 ± 38 | 866 ± 48 | 800 ± 48 |
| TCZ temp. (Max.), C. | 966 | 1001.7 | 1002 | 975 |
| Char gasification (CG) chamber top, Ave., C. | 706 ± 38 | 770 ± 22 | 556 ± 208 | 708 ± 50 |
| CG chamber top, (Max), C. | 793 | 819 | 786 | 844 |
| CG chamber mid, (Ave.) C. | 742 ± 27 | 790 ± 26 | 607 ± 181 | 731 ± 25 |
| CG chamber mid, (Max.) C. | 789 | 827.7 | 768 | 769 |
| Gas temperature after cyclone separator, C. | 352 ± 4 | 383 | 350 ± 7 | 356 ± 26 |
| Flame temp. (Ave.), C. | 770 ± 25 | 780 ± 31 | 777 ± 30 | 777 ± 24 |
| Flame temp. (Max.), C. | 813 | 843.4 | 829 | 829 |
| Pressure drop across gasifier, Inch of water | 11.0 ± 0.6 | 12.0 ± 0.4 | 10.4 ± 0.4 | 10.4 ± 0.3 |
| Gas composition, % vol. | | | | |
| CO | 22.7 ± 0.9 | 21 ± 0.9 | 21.2 ± 2.1 | 21.6 ± 1.3 |
| $H_2$ | 10.9 ± 1.6 | 11.9 ± 2.3 | 11.6 ± 1.7 | 12.4 ± 2.2 |
| $CH_4$ | 3.4 ± 0.7 | 3 ± 0.7 | 3.1 ± 0.8 | 3.6 ± 1.1 |
| $CO_2$ | 13.4 ± 0.9 | 13.3 ± 1.1 | 13.4 ± 0.6 | 13.1 ± 1.0 |
| $N_2$ | 48.8 ± 1.7 | 50.3 ± 1.8 | 50 ± 2.1 | 48.3 ± 3.5 |
| $C_2H_2$ | ND* | 0.1 ± 0.2 | ND* | 0.2 ± 0.4 |
| $C_2H_4$ | 0.5 ± 0.1 | 0.4 ± 0.2 | 0.5 ± 0.1 | 0.7 ± 0.3 |
| $C_2H_6$ | 0.2 ± 0.3 | 0.1 ± 0.1 | 0.1 ± 0.3 | 0.1 ± 0.1 |
| LHV gas (kcal/Nm$^3$)[†] | 1369 | 1277 | 1293 | 1423 |
| Dry gas yield (Nm$^3$/kg) | 1.69 | 1.88 | 2.16 | 1.60 |
| Tar content, g/Nm$^3$ | Not measured | 7.5 | 5 | 12 |
| Particulates, g/Nm$^3$ | Not measured | 0.45 | 0.4 | 0.4 |
| Hot gas efficiency, % | 63.2 | 71.6 | 80.7 | 60.5 |
| Cold gas efficiency, % | 56.3 | 63 | 71.9 | 54 |
| Mass balance, % | 98 | 101 | 105 | 94 |

*Not detected;
[†]Nm$^3$ refers to a cubic meter of gas at a standard temperature of 0° C. and pressure of 1 atm

TABLE 3

Gasifier performance comparison with other published data on conventional downdraft gasification systems

| Feedstock | Air-to-fuel ratio, Nm$^3$/kg | Tar cracking Temp, ° C. | % Volume CO | % Volume $H_2$ | Tar, g/Nm$^3$ |
|---|---|---|---|---|---|
| Hazelnut shells | 1.46 | 1050 | 21 | 13.1 | 3.0 |
| Sewage sludge | 2.3 | 1077 | 10.6 | 10.9 | 6.26 |
| Wood chips | Equivalence ratio of 0.38 | 1000 | 24 | 14 | No data |
| Pine wood pellets (this study) | Equivalence ratio of 0.23 | 1000 | 21 | 12 | 5.0 |

TABLE 4

Switchgrass characteristics

| | % db |
|---|---|
| Moisture content | 11.6 |
| Carbon | 49.67 |
| Hydrogen | 5.27 |
| Oxygen | 40.31 |
| Nitrogen | 0.57 |

TABLE 4-continued

Switchgrass characteristics

| | % db |
|---|---|
| Sulphur | 0.07 |
| Ash | 4.11 |
| Lower heating value, kcal/kg | 4118 |
| Bulk density, kg/m$^3$ | 138 |

TABLE 5

Summary of results for gasification tests

| | | | | |
|---|---|---|---|---|
| Specific air input rate, kg of air/h-sq. m | 437 | 542 | 542 | 647 |
| Specific gasification rate, cu. m dry gas/h-sq. m | 507 | 639 | 688 | 736 |
| Equivalence ratio | 0.22 | 0.22 | 0.20 | 0.23 |
| Fuel feed rate, kg/h | 12.8 | 16.7 | 18.4 | 19.7 |
| Air temperature, C. | 16.0 ± 0.8 | 10.1 ± 1.1 | 25.0 ± 3.0 | 20.0 ± 2.0 |
| Tar cracking temp. (CG1), C. | 1078 ± 101 | 1050 ± 76 | 1003 ± 135 | 1110 ± 107 |
| CG1 temperature (max.), C. | 1261 | 1169 | 1318 | 1336 |
| Temperature below grate, C. | 355 ± 91 | 374 ± 120 | 360 ± 57 | 441 ± 69 |
| Flame temperature, C. | 717 ± 49 | 768 ± 34 | 764 ± 50 | 813 ± 30 |
| Flame temperature (max.), C. | 791 | 815 | 920 | 871 |
| Pressure drop across gasifier, cm of water | 4 ± 3 | 9 ± 5 | 15 ± 6 | 16 ± 8 |
| CO, % vol. | 23.5 ± 3.2 | 24.4 ± 1.3 | 22.1 ± 4.3 | 19.2 ± 1.6 |
| H$_2$, % vol. | 10.9 ± 1.9 | 11.4 ± 0.7 | 12.0 ± 1.4 | 9.8 ± 1.2 |
| CH$_4$, % vol. | 3.9 ± 0.6 | 3.3 ± 0.5 | 4.5 ± 0.2 | 2.5 ± 0.7 |
| CO$_2$, % vol. | 7.9 ± 1.9 | 7.8 ± 1.1 | 11.2 ± 0.8 | 13.7 ± 0.4 |
| N$_2$, % vol. | 52.9 ± 1.2 | 52.1 ± 2.1 | 48.5 ± 3.5 | 54 ± 2.4 |
| LHV gas, kcal/Nm$^3$ | 1437 | 1458 | 1673 | 1160 |
| Dry gas yield, kg/kg of dry biomass | 1.8 | 1.8 | 1.7 | 1.7 |
| Hot gas efficiency, % | 79 | 75 | 89 | 63 |
| Cold gas efficiency, % | 69 | 65 | 78 | 52 |
| Mass balance, % | 89 | 87 | 93 | 89 |

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A downdraft gasifier comprising:
a pyrolysis and tar cracking section having a perforated inner cylinder for receiving biomass and an outer surrounding cylinder for receiving gases from the biomass, the inner and outer cylinder being in a fixed relationship with respect to one another;
a pressurized air supply feeding into an upper region of annular space defined by the inner and outer cylinders imparting a cyclonic movement to gasses escaping an inner chamber defined by the inner wall;
a stirrer that stirs biomass material within the pyrolysis and tar cracking section; and
a char gasification section for receiving biomass and gases from the pyrolysis and tar cracking section, the char gasification section providing a grating and scraper for passing gases and ash and retaining biomass for char gasification on the grate.

2. The gasifier of claim 1 wherein the pyrolysis and tar cracking section is arranged superior to the char gasification section.

3. The gasifier of claim 2 further comprising a biomass feeding unit that selectively provides biomass through an airlock to a biomass section superior to the pyrolysis and tar cracking section.

4. The gasifier of claim 1 further comprising a cyclonic separator that removes particulate from the gas leaving the char gasification section.

5. The gasifier of claim 1 further comprising an ash chamber below the char gasification section that catches ash and solid falling through the grate.

6. The gasifier of claim 5, further comprising an ash conveyor that removes ash from the ash chamber to a remote ash chamber.

7. A downdraft gasifier comprising:
a biomass feeding section having a selectively opening airlock;
a combustion chamber having:
a biomass section that accepts raw biomass materials from the feeding section;
a pyrolysis and tar cracking section having an inner perforated cylinder that is fixed and nonrotating and used for receiving biomass from the biomass section and an outer surrounding cylinder for receiving gases from the biomass;
a pressurized air supply feeding into an upper region of an annular space defined by the inner and outer cylinders imparting a cyclonic movement to gasses escaping the inner cylinder;
a stirrer that stirs biomass material within the biomass section and the pyrolysis and tar cracking section; and
a char gasification section for receiving biomass and gases from the pyrolysis and tar cracking section, the char gasification section providing a grating and scraper for passing gases and ash and retaining biomass for char gasification on the grate;
an ash chamber collecting ash from the grating; and
a separator that separates remaining particulate from the gas.

8. The gasifier of claim 7, further comprising an ash conveyor for moving ash from the ash chamber to a remote ash chamber.

9. The gasifier of claim 7, wherein the separator is a cyclonic separator.

10. The gasifier of claim 7 further comprising a gas inlet on the pyrolysis and tar cracking section providing fuel for heating the combustion chamber.

* * * * *